(12) United States Patent
Kawasaki et al.

(10) Patent No.: US 8,900,656 B2
(45) Date of Patent: Dec. 2, 2014

(54) METHOD FOR PRODUCING OPTICAL FILM, OPTICAL FILM, AND IMAGE DISPLAY

(75) Inventors: Motoko Kawasaki, Ibaraki (JP); Toshiyuki Iida, Ibaraki (JP); Nao Murakami, Ibaraki (JP); Hiroyuki Yoshimi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 614 days.

(21) Appl. No.: 12/813,592

(22) Filed: Jun. 11, 2010

(65) Prior Publication Data
US 2010/0321780 A1 Dec. 23, 2010

(30) Foreign Application Priority Data

Jun. 19, 2009 (JP) ................................ 2009-146328
Mar. 29, 2010 (JP) ................................ 2010-076119

(51) Int. Cl.
*B05D 5/06* (2006.01)
*G02B 5/30* (2006.01)
*G02F 1/13363* (2006.01)

(52) U.S. Cl.
CPC ........ *G02B 5/3083* (2013.01); *G02F 1/133634* (2013.01)
USPC ....................................................... 427/162

(58) Field of Classification Search
CPC ............ B29C 55/08; G02B 5/32; G02B 5/30; B02B 5/3083; B05D 5/061; B05D 5/06
USPC ....................................................... 427/162
See application file for complete search history.

(56) References Cited

U.S. PATENT DOCUMENTS

| | | |
|---|---|---|
| 5,245,456 A | 9/1993 | Yoshimi et al. |
| 5,580,950 A | 12/1996 | Harris et al. |
| 7,223,452 B2 | 5/2007 | Murakami et al. |

(Continued)

FOREIGN PATENT DOCUMENTS

| | | |
|---|---|---|
| CN | 1758106 A | 4/2006 |
| CN | 1774654 A | 5/2006 |

(Continued)

OTHER PUBLICATIONS

Korean Office Action dated Oct. 24, 2011, issued in corresponding Korean Patent Application No. 10-2010-0057665. (w/partial translation).

(Continued)

*Primary Examiner* — Elizabeth Burkhart
(74) *Attorney, Agent, or Firm* — Westerman, Hattori, Daniels & Adrian, LLP

(57) ABSTRACT

A method for producing an optical film including a birefringent layer having a refractive index distribution satisfying $nx>nz>ny$ that can be produced by a small number of steps, contains less foreign matter trapped therein, and has high productivity. The method includes steps of: forming a coating film by directly applying a material for forming a birefringent layer on the shrinkable film; shrinking the coating film in a first direction by shrinking the shrinkable film; and stretching a laminate of the shrinkable film and the coating film in a second direction orthogonal to the first direction, wherein the material for forming a birefringent layer contains at least one resin selected from norbornene resins, polycarbonate resins, cellulose resins, polyamides, and polyurethanes, and wherein the birefringent layer has a refractive index distribution satisfying $nx>nz>ny$. An optical film produced by the method.

5 Claims, 2 Drawing Sheets

(56) References Cited

U.S. PATENT DOCUMENTS

| | | |
|---|---|---|
| 2006/0028601 A1 | 2/2006 | Kawahara et al. |
| 2006/0055853 A1 | 3/2006 | Murakami et al. |
| 2006/0055855 A1 | 3/2006 | Duz et al. |
| 2006/0072057 A1 | 4/2006 | Yano et al. |
| 2006/0078693 A1* | 4/2006 | Ishibashi et al. ............ 428/1.31 |
| 2006/0182896 A1 | 8/2006 | Murakami et al. |
| 2006/0257078 A1 | 11/2006 | Kawahara et al. |
| 2006/0275559 A1* | 12/2006 | Ishibashi et al. ............ 428/1.31 |
| 2007/0177087 A1* | 8/2007 | Kawahara et al. ........... 349/121 |
| 2008/0123189 A1 | 5/2008 | Ikeda et al. |
| 2010/0188749 A1 | 7/2010 | Hirayama et al. |

FOREIGN PATENT DOCUMENTS

| | | | |
|---|---|---|---|
| JP | 5-157911 A | 6/1993 | |
| JP | 05-313014 A | 11/1993 | |
| JP | 2000-9930 A | 1/2000 | |
| JP | 2001-249225 A | 9/2001 | |
| JP | 2003-075824 A | 3/2003 | |
| JP | 2004-78203 A | 3/2004 | |
| JP | 2005-258459 A | 9/2005 | |
| JP | 2005-339595 A | 12/2005 | |
| JP | 2006-133720 A | 5/2006 | |
| JP | 2006-195350 A | 7/2006 | |
| JP | 2006-274135 A | 10/2006 | |
| JP | 2008-171007 A | 7/2008 | |
| JP | 2008-281667 A | 11/2008 | |
| JP | 2009-86604 A | 4/2009 | |
| KR | 2006-0050240 A | 5/2006 | |
| KR | 2007-0015634 A | 2/2007 | |
| TW | 200428110 A | 12/2004 | |
| TW | 200619698 A | 6/2006 | |
| WO | 2005/059609 A1 | 6/2005 | |
| WO | 2009/034823 A1 | 3/2009 | |

OTHER PUBLICATIONS

Chinese Office Action dated May 3, 2012, issued in corresponding Chinese Patent Application No. 201010208587.7, with Partial English translation (6 pages).
Chinese Office Action dated Jun. 23, 2011, issued in corresponding Chinese Patent Application No. 2010-10208587.7.(w/partial translation).
Decision of Rejection dated Jun. 27, 2012, issued in corresponding Korean Patent Application No. 10-2010-0057665, with Partial translation (5 pages).
Trial Decision dated Mar. 21, 2013, issued in corresponding Korean Patent Application No. 10-2010-0057665, with Partial English translation (19 pages).
Taiwanese Office Action dated May 24, 2013, issued in corresponding Taiwanese Patent Application No. 099119913 with partial translation (6 pages).
International Search Report of PCT/JP2010/060344, mailing date Jul. 27, 2010.
Japanese Office Action dated Feb. 22, 2011, issued in Japanese Patent Application No. 2010-139102, w/ partial English translation.
Korean Office Action dated May 3, 2013, issued in application No. 10-2012-7000988, w/ partial English translation.
Japanese Office Action dated Oct. 2, 2013, issued in corresponding Japanese Patent Application No. 2010-139098, w/ partial English translation.
US Office Action dated Nov. 21, 2013, issued in U.S. Appl. No. 13/376,515.
U. S. Office Action dated Jun. 19, 2014, issued in U.S. Appl. No. 13/376,515 (23 pages).

* cited by examiner

METHOD FOR PRODUCING OPTICAL FILM, OPTICAL FILM, AND IMAGE DISPLAY

CROSS-REFERENCE TO RELATED APPLICATION

This application claims priority from Japanese Patent Application Nos. 2009-146328 filed on Jun. 19, 2009 and 2010-076119 filed on Mar. 29, 2010. The entire subject matter of the Japanese Patent Applications are incorporated herein by reference.

BACKGROUND OF THE INVENTION

1. Field of the Invention

The present invention relates to a method for producing an optical film, an optical film, and an image display.

2. Description of Related Art

For various image displays such as a mobile phone, a PC monitor, a liquid crystal television, and the like, liquid crystal displays (LCDs) with high contrast utilizing birefringence are used. In these years, definition of LCDs is getting higher and the application thereof covers a broad spectrum, so that improvement of display qualities of LCDs such as increase in a viewing angle, and the like is required. For the increase in a viewing angle, for example, an optical film having a refractive index distribution satisfying nx>nz>ny is used. As a method for producing the optical film, a method is proposed in which an optical film is produced by forming a laminate by attaching a shrinkable film on one side or both sides of a resin film through an acrylic pressure sensitive adhesive agent or the like, and subjecting the laminate to a heat stretching treatment while imparting a shrinking force to the laminate in a direction orthogonal to the stretching direction (JP5-157911 A).

SUMMARY OF THE INVENTION

The aforementioned producing method requires a large number of steps such as a step of producing a resin film, a step of applying a pressure sensitive adhesive agent on a shrinkable film, a step of attaching the resin film and the shrinkable film, a step of stretching and shrinking, and a step of removing the shrinkable film, and has low productivity. Further, in the aforementioned producing method, application defects are caused and foreign matters are trapped with high frequency in the step of attaching and productivity is further decreased. Moreover, in the aforementioned producing method, adhesive deposits are generated in the step of removing, and productivity is further decreased. In the aforementioned producing method, alignment defects are caused due to defects in adhesive property such as nonuniformity of adhesive force and flaking, and the quality of the optical film is decreased.

The present invention is intended to provide a method for producing an optical film including a birefringent layer having a refractive index distribution satisfying nx>nz>ny that can be produced by a small number of steps, contains less foreign matter trapped therein, and has high productivity.

In order to achieve the aforementioned object, the method for producing an optical film of the present invention is a method for producing an optical film including a birefringent layer. The method includes steps of; forming a film (hereinafter, referred to as "coating film") by directly applying a material for forming a birefringent layer on the shrinkable film; shrinking the coating film in a first direction by shrinking the shrinkable film; and stretching a laminate of the shrinkable film and the coating film in a second direction orthogonal to the first direction, wherein the material for forming a birefringent layer contains at least one resin selected from the group consisting of norbornene resins, polycarbonate resins, cellulose resins, polyamides, and polyurethanes, and wherein the birefringent layer has a refractive index distribution satisfying nx>nz>ny.

nx: a refractive index in a direction (a slow axis direction) in which an in-plane refractive index of the birefringent layer reaches its maximum ny: a refractive index in a direction (a fast axis direction) that is orthogonal to the nx direction within a plane of the birefringent layer nz: a refractive index in a thickness direction of the birefringent layer that is orthogonal to each of the nx and ny directions.

In the method for producing an optical film of the present invention, a material for forming a birefringent layer is directly applied on a shrinkable film without using a pressure sensitive adhesive agent or the like. Therefore, according to the present invention, a step of attaching a resin film and a shrinkable film that is conducted in a conventional method can be omitted and productivity is increased. Further, according to the present invention, since the step of attaching can be omitted, application defects and foreign matters trapped therein can be reduced, and productivity is further increased. Since alignment defects due to defects in adhesive property are not caused, the present invention provides an optical film of high quality. Moreover, since the number of steps and foreign matters trapped therein can be reduced, the present invention brings about an adventitious effect that an optical film with high alignment axis accuracy can be obtained.

DETAILED DESCRIPTION OF THE INVENTION

Figure 1:
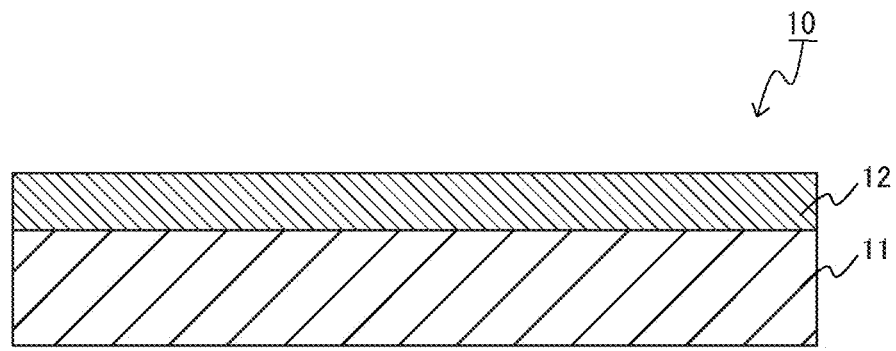
FIG. 1 is a cross sectional view showing an example of the structure of the optical film of the present invention.

In the present invention, "orthogonal" encompasses a case of substantially orthogonal. The "substantially orthogonal" is, for example, in the range of 90°±2° and preferably in the range of 90°±1°.

In the method for producing an optical film of the present invention, the stretch ratio of the laminate in the stretching is preferably in the range from 1.01-fold to 3.00-fold, more preferably in the range from 1.05-fold to 2.00-fold, and further preferably in the range from 1.10-fold to 1.50-fold.

In the method for producing an optical film of the present invention, the shrinkage ratio of the coating film in the shrinking is preferably in the range from 0.50-fold to 0.99-fold, more preferably in the range from 0.60-fold to 0.95-fold, and further preferably in the range from 0.65-fold to 0.90-fold.

In the method for producing an optical film of the present invention, it is preferable that the shrinkable film is a stretched film formed from at least one material selected from the group consisting of acrylic resins, polyolefins, polyesters, polyamides, polycarbonate resins, norbornene resins, polystyrenes, polyvinyl chlorides, polyvinylidene chlorides, cellulose resins, polyether sulfones, polysulfones, polyimides, polyacrylics, acetate resins, polyarylates, polyvinyl alcohols, and liquid crystal polymers.

In the method for producing an optical film of the present invention, it is preferable that, wherein in the shrinking, the shrinkable film is shrunk by heating.

The optical film of the present invention is an optical film including a birefringent layer. The optical film is produced by the method for producing an optical film of the present invention.

In the optical film of the present invention, the front retardation of the birefringent layer is preferably in the range from 100 nm to 500 nm, more preferably in the range from 100 nm to 300 nm, and further preferably in the range from 130 nm to 290 nm. The front retardation can be calculated by the formula "(nx−ny)×d" with a refractive index in a direction (a slow axis direction) in which an in-plane refractive index of the birefringent layer reaches its maximum being nx, a refractive index in a direction (a fast axis direction) that is orthogonal to the nx direction within a plane of the birefringent layer being ny, and the thickness of the birefringent layer being d(nm).

The image display of the present invention includes the optical film of the present invention.

Next, the present invention will be explained in more detail. However, the present invention is not limited by the following description.

The optical film of the present invention is produced by forming a coating film by directly applying a material for forming a birefringent layer on a shrinkable film, shrinking the coating film by shrinking of the shrinkable film, and stretching a laminate of the shrinkable film and the coating film in a direction orthogonal to the shrinking direction.

The material for forming a shrinkable film is not particularly limited, however is preferably a thermoplastic resin because it is suitable to a stretching and shrinking treatment that will be described later. Examples thereof include acrylic resins; polyolefin resins such as polyethylene, polypropylene (PP), and the like; polyester resins such as polyethylene terephthalate (PET) and the like; polyamide; a polycarbonate resin; a norbornene resin; polystyrene; polyvinyl chloride; polyvinylidene chloride; cellulose resins such as triacetylcellulose, and the like; polyether sulfone; polysulfone; polyimide; polyacrylic; an acetate resin; polyarylate; a polyvinyl alcohol; mixtures thereof; and the like. Further, a liquid crystal polymer or the like can be used. The shrinkable film is preferably a uniaxially- or biaxially-stretched film formed from one of or more than one of the material for forming a shrinkable film. For example, commercially available shrinkable films can be used. Examples thereof include "SPACE CLEAN" produced by Toyobo Co., Ltd., "FANCY WRAP" produced by GUNZE Limited, "TORAYFAN" produced by Toray Industries, Inc., "LUMIRROR" produced by Toray Industries, Inc., "ARTON" produced by JSR Corporation, "ZEONOR" produced by ZEON CORPORATION, "SUNTEC" produced by Asahi Chemical Industry Co., Ltd., and the like.

The thickness of the shrinkable film is not particularly limited, however is, for example, in the range from 10 μm to 300 μm, preferably in the range from 20 μm to 200 μm, and more preferably in the range from 40 μm to 150 μm. The surface of the shrinkable film may be applied with a surface treatment for the purpose of increasing adhesion with the birefringent layer. Examples of the surface treatment include chemical or physical treatments such as a chromic acid treatment, ozone exposure, flame exposure, high pressure electric shock exposure, an ionized radiation treatment, and the like. Further, on the surface of the shrinkable film, a primer layer may be formed by applying an undercoating agent (e.g., adherent material).

The material for forming a birefringent layer includes at least one resin selected from the group consisting of norbornene resins, polycarbonate resins, cellulose resins, polyamides, and polyurethanes.

The norbornene resin has a characteristic that an absolute value (C [λ], the λ can be, for example, 590 nm) of a photoelastic coefficient is small. The absolute value (C [590]) of the photoelastic coefficient of the norbornene resin at the wavelength of 590 nm is preferably in the range from $1\times10^{-12}$ $m^2/N$ to $1\times10^{-11}$ $m^2/N$. In the present invention, "norbornene resin" is a (co)polymer that is obtained by using a norbornene monomer having a norbornene ring for a part or the whole of a starting material (monomer). The "(co)polymer" represents a homopolymer or a copolymer.

The norbornene resin uses a norbornene monomer having a norbornene ring (norbornane ring having a double bond) as a starting material. The norbornene resin may have or may not have a norbornane ring as a structural unit in a state of (co) polymer. Examples of the norbornene resin having a norbornane ring as a structural unit in a state of (co)polymer include tetracyclo[$4.4.1^{2,5}.1_{7,10}$.0]deca-3-en, 8-methyltetracyclo[$4.4.1^{2,5}.1_{7,10}$.0]deca-3-en, 8-methoxycarbonyltetracyclo[$4.4.1^{2,5}.1_{7,10}$.0]deca-3-en, and the like. The norbornene resin not having a norbornane ring as a structural unit in a state of (co)polymer is, for example, a (co)polymer obtained by using a monomer that is turned into a five-membered ring by cleavage. Examples of the monomer that is turned into a five-membered ring by cleavage include norbornene, dicyclopentadiene, 5-phenyl norbornene, a derivative thereof, and the like. When the norbornene resin is a copolymer, an alignment of its molecules is not particularly limited and may be a random copolymer, a block copolymer, or a graft copolymer.

Examples of the norbornene resin include (a) a resin obtained by hydrogenating a ring-opening (co)polymer of a norbornene monomer, (b) a resin obtained by conducting an addition (co)polymerization of a norbornene monomer, and the like. The resin obtained by hydrogenating a ring-opening copolymer of a norbornene monomer includes a resin that is obtained by hydrogenating a ring-opening copolymer of at least one kind of norbornene monomers and at least one of α-olefins, cycloalkenes, and unconjugated dienes. The resin obtained by conducting an addition copolymerization of a norbornene monomer includes a resin that is obtained by conducting an addition copolymerization of at least one kind of norbornene monomers with at least one of α-olefins, cycloalkenes, and unconjugated dienes.

The resin obtained by hydrogenating a ring-opening (co) polymer of a norbornene monomer can be obtained by conducting a metathesis reaction of a norbornene monomer to obtain a ring-opening (co)polymer, and then hydrogenating the thus obtained ring-opening (co)polymer. Examples of such a producing method include the method described in the paragraphs [0059] to [0060] in JP11(1999)-116780 A, the method described in the paragraphs [0035] to [0037] in JP2001-350017 A, and the like. The resin obtained by conducting an addition (co)polymerization of a norbornene monomer can be produced by the method described in Example 1 in JP61 (1986)-292601 A.

The weight-average molecular weight (Mw) of the norbornene resin that is measured by a gel permeation chromatography (GPC) method using a tetrahydrofuran solvent is preferably in the range from 20,000 to 500,000. The glass-transition temperature (Tg) of the norbornene resin is preferably in the range from 120° C. to 170° C. By using the aforementioned resin, a birefringent layer that is superior in heat resistance and stretchability can be obtained. The glass-transition temperature (Tg) is, for example, a value calculated by a differential scanning calorimetry (DSC) method based on JIS K 7121.

As the polycarbonate resin, an aromatic polycarbonate resin composed of an aromatic bivalent phenol component and a carbonate component is preferably used. The aromatic polycarbonate resin can be, normally, obtained by a reaction of an aromatic bivalent phenol compound and a carbonate precursor substance. That is, the aromatic polycarbonate resin can be obtained by a phosgene method in which phosgene is spewed into an aromatic bivalent phenol compound in the presence of caustic alkali and a solvent, or a transesterification method in which transesterification of an aromatic bivalent phenol compound and bisaryl carbonate is conducted in the presence of a catalyst.

Examples of the aromatic bivalent phenol compound include 2,2-bis(4-hydroxyphenyl)propane, 9,9-bis(4-hydroxyphenyl)fluorine, 4,4'-biphenol, 4,4'-dihydroxybiphenylether, 2,2-bis(3-methyl-4-hydroxyphenyl)propane, 2,2-bis(3-bromo-4-hydroxyphenyl)propane, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl)butane, 2,2-bis(4-hydroxy-3,5-dimethylphenyl)butane, 2,2-bis(4-hydroxy-3,5-dipropylphenyl)propane, 1,1-bis(4-hydroxyphenyl)cyclohexane, 1,1-bis(4-hydroxyphenyl)-3,3,5-trimethylcyclohexane, and the like. One of the aromatic bivalent phenol compounds may be used alone or two or more of them may be used in combination.

Examples of the carbonate precursor substance include phosgene, bischloroformate of the bivalent phenols, diphenyl carbonate, di-p-tolyl carbonate, phenyl-p-tolyl carbonate, di-p-chlorophenyl carbonate, dinaphthyl carbonate, and the like. Among them, phosgene and diphenyl carbonate are preferable.

The weight-average molecular weight (Mw) of the polycarbonate resin that is measured by a gel permeation chromatography (GPC) method using a tetrahydrofuran solvent is preferably in the range from 25,000 to 250,000, more preferably in the range from 30,000 to 200,000, and further preferably in the range from 40,000 to 100,000. By setting the weight-average molecular weight in the aforementioned range, a birefringent layer that is superior in operability such as solubility, formability, casting, and the like, and superior in mechanical strength can be formed.

Among them, as the polycarbonate resin, the one that includes a repeat unit (A) represented by the following general formula (1) is preferable.

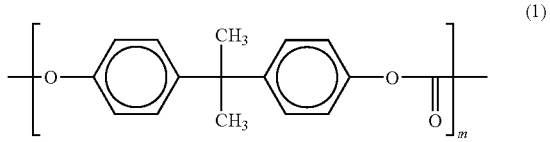

(1)

In the formula (1), m is an integer of 1 or more.

It is preferable that the cellulose resin is substituted by an acetyl group and a propionyl group. The lower limit of the substitution degree "(DSac (substitution degree of acetyl)+DSpr (substitution degree of propionyl)" of this cellulose resin is preferably 2 or more, more preferably 2.3 or more, and further preferably 2.6 or more. The "DSac+DSpr" shows the average degree of substitution of three hydroxyl groups that present in a repeat unit of cellulose by the acetyl group or the propionyl group. The upper limit of the "DSac+DSpr" is preferably 3 or less, more preferably 2.9 or less, and further preferably 2.8 or less. By setting the substitution degree of the cellulose resin in the aforementioned range, a birefringent layer having a desired refractive index distribution can be obtained.

The lower limit of the DSpr (substitution degree of propionyl) is preferably 1 or more, more preferably 2 or more, and further preferably 2.5 or more. The upper limit of the DSpr is preferably 3 or less, more preferably 2.9 or less, and further preferably 2.8 or less. By setting the DSpr in the aforementioned range, solubility of the cellulose resin to a solvent is increased and the thickness of the birefringent layer thus obtained can be adjusted easily. Further, by setting the "DSac+DSpr" and the DSpr in the aforementioned ranges respectively, a birefringent layer having an optical property and a wavelength dependency of inverse dispersion can be obtained.

The DSac (substitution degree of acetyl) and the DSpr (substitution degree of propionyl) can be obtained by the method described in the paragraphs [0016] to [0019] in JP2003-315538 A.

The cellulose resin may include substituents other than the acetyl group and the propionyl group. Examples thereof include ester groups such as butyrate and the like; ether groups such as an alkyl ether group, an aralkylene ether group, and the like; and the like.

The number average molecular weight of the cellulose resin is preferably in the range from 5,000 to 100,000, and more preferably in the range from 10,000 to 70,000. By setting the number average molecular weight in the aforementioned range, productivity and mechanical strength of a birefringent layer are increased.

Any appropriate methods can be employed as a method for substituting the cellulose resin by the acetyl group and the propionyl group. For example, cellulose is turned into alkali cellulose by treating with a strong caustic soda solution, and this is acylated with a mixture of a predetermined amount of acetic anhydride and propionic anhydride. The substitution degree "DSac+DSpr" is adjusted by partially hydrolyzing an acyl group.

As the polyamide, for example, the polyamide described in JP10(1998)-508048 A can be used. The repeat unit thereof can be represented by the following general formula (2), for example.

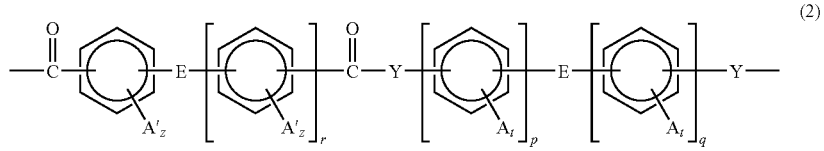

(2)

In the formula (2), Y represents O or NH. Further, E represents at least one selected from the group consisting of covalent bonds, $C_2$ alkylene groups, $C_2$ alkylene halide groups, $CH_2$ groups, $C(CX_3)_2$ groups (here, X is a halogen or hydrogen), CO groups, O atoms, S atoms, $SO_2$ groups, $Si(R)_2$ groups, and N(R) groups, and each may be identical to or different from each other. In the E, the R is at least one of $C_1$ to $C_3$ alkyl groups and $C_1$ to $C_3$ alkyl halide groups, and is at a meta-position or a para-position with respect to a carbonyl functional group or a Y group.

In the formula (2), A and A' are substituents, and t and z each independently represent the number of substituents, respectively. Further, p is an integer from 0 to 3, q is an integer from 1 to 3, and r is an integer from 0 to 3.

The A is, for example, selected from the group consisting of hydrogen, halogens, $C_1$ to $C_3$ alkyl groups, $C_1$ to $C_3$ alkyl halide groups, alkoxy groups represented by OR (here, R is as defined above), allyl groups, substituted allyl groups by halogenations or the like, $C_1$ to $C_9$ alkoxycarbonyl groups, $C_1$ to $C_9$ alkyl carbonyl oxy groups, $C_1$ to $C_{12}$ alkyloxycarbonyl groups, $C_1$ to $C_{12}$ alkylcarbonyloxy groups and substituted derivatives thereof, $C_1$ to $C_{12}$ alkylcarbamoyl groups, and $C_1$ to $C_{12}$ alkylcarbonylamino groups and substituted derivatives thereof. When more than one A is present, each may be identical to or different from each other. The A' is, for example, selected from the group consisting of halogens, $C_1$ to $C_3$ alkyl groups, $C_1$ to $C_3$ alkyl halide groups, phenyl groups, and substituted phenyl groups. When more than one A' is present, each may be identical to or different from each other. Examples of a substituent on a phenyl ring of the substituted phenyl group include a halogen, $C_1$ to $C_3$ alkyl groups, $C_1$ to $C_3$ alkyl halide groups, and a combination thereof. Further, t is an integer from 0 to 4 and z is an integer from 0 to 3.

Among the repeat units of the polyamide represented by the formula (2), the one represented by the following formula (3) is preferable.

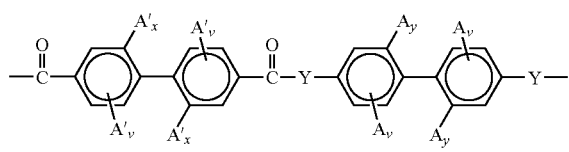

(3)

In the formula (3), A, A', and Y are as defined above, v is an integer from 0 to 3 and preferably an integer from 0 to 2. Further, x and y each are 0 or 1, provided that are not both 0.

As the polyurethane, for example, those described in JP2004-138855 A, JP2004-339406 A, and JP2004-339408 A can be used.

It is preferable that the material for forming a birefringent layer further contains a solvent for dissolving the aforementioned resins. The solvent can be selected suitably according to the type of resin. Examples thereof include chloroform, dichloromethane, toluene, methylene chloride, xylene, cyclohexanone, cyclopentanone, and the like. One of the solvents may be used alone or two or more of them may be used in combination.

In particular, in view of reduction of environmental burdens, it is preferable to use non-halogen solvents. Preferable examples thereof include aromatic hydrocarbons, ketones, esters, and the like. Above all, toluene, methylene chloride, xylene, and cyclopentanone are preferable, and toluene and methylene chloride are most preferable. Further, mixed solvents containing the non-halogen solvents also can be used preferably. When the mixed solvent is used, the proportion of the non-halogen solvent to be added with respect to the total amount of the solvent is preferably 50% by weight or more, and more preferably 80% by weight or more. Above all, the mixed solvent preferably contains toluene or methylene chloride at 50% by weight or more, and more preferably contains toluene or methylene chloride at 80% by weight or more. In this case, examples of the solvent other than toluene and methylene chloride include cyclopentanone, cyclohexanone, 4-methyl-2-pentanone (methyl isobutyl ketone, MIBK), N,N-dimethylacetamide (DMAc), dimethylformamide (DMF), dimethylsulfoxide (DMSO), and the like. Since the aforementioned resins have high solubility to solvents, they are soluble to these low polarity solvents.

The method for preparing the material for forming a birefringent layer is not particularly limited, and conventionally known methods can be employed. For example, a method can be employed in which, under stirring of the solvent, a powdered resin or a molded resin, which is molded into a pellet or a tablet, is gradually added to be dissolved until a desired concentration of the resin is obtained.

The concentration of the resin in the material for forming a birefringent layer is not particularly limited. However, for example, in order to obtain appropriate viscosity for application, the concentration of the resin is preferably in the range from 1% by weight to 30% by weight, and more preferably in the range from 1% by weight to 20% by weight. It is to be noted that "appropriate viscosity for application" means viscosity that has fluidity to the level in which application defects such as unfavorable streaks are not caused at the time of application. The viscosity is, for example, preferably 400 mPa·sec or less, although it differs depending on the type, the application speed, and the thickness of the shrinkable film. When the thickness of the optical film is 20 μm or less, since unfavorable streaks are prone to occur, it is particularly preferable to set the viscosity in the aforementioned range. The viscosity is more preferably 300 mPa·sec or less. Further, the viscosity is preferably 1 mPa·sec or more because it allows the optical film to have the desired thickness without difficulty. It is to be noted that the viscosity here is a measured value at 25° C.

The material for forming a birefringent layer may further contain additives if necessary. Examples of the additive include an antioxidant, an ultraviolet screening agent, an optical anisotropy adjuster, a plasticizer, an infrared absorption agent, a filler, and the like. The additive may be solid or liquid. In other words, neither the melting point nor the boiling point of the additive is particularly limited.

A coating film is formed by directly applying the material for forming a birefringent layer on the shrinkable film. Examples of the method for applying the material for forming a birefringent layer include a spin coating method, a roll coating method, a flow coating method, a printing method, a dip coating method, a casting method, a bar coating method, a gravure printing method, and the like. At the time of application, a multilayer coating may be employed if necessary.

Next, the coating film is shrunk by shrinking of the shrinkable film and a laminate of the shrinkable film and the coating film is stretched in a direction orthogonal to the shrinking direction of the coating film. In this case, it is preferable that the laminate is stretched in the width direction (TD direction) of the shrinkable film and the coating film is shrunk in the longitudinal direction (MD direction) of the shrinkable film. In advance of stretching and shrinking, or during stretching and shrinking, it is preferable to dry the coating film. The coating film may be dried naturally, dried by blowing air, dried by heating, or dried by a combination method thereof. Conditions for drying can be defined suitably according to, for example, the type of the shrinkable film, the type of the resin and the solvent, the concentration of the resin, and the like. The drying temperature is, for example, in the range from 25° C. to 300° C., preferably in the range from 50° C. to 200° C., and further preferably in the range from 60° C. to 180° C. The drying can be conducted at a constant temperature or may be conducted by raising or falling a temperature in a stepwise manner. When the drying is conducted in advance of stretching and shrinking, it is preferable that the drying is conducted at a temperature in which shrinking of the shrinkable film does not occur. Further, the time for drying is not particularly limited, however is, for example, in the range from 10 seconds to 60 minutes and preferably in the range from 30 seconds to 30 minutes.

The coating film is shrunk by shrinking of the shrinkable film and a laminate of the shrinkable film and the coating film is stretched in a direction orthogonal to the shrinking direction of the coating film. The shrinking and the stretching may be performed individually, however are preferably performed simultaneously. By performing the shrinking and the stretching simultaneously, the alignment expressed by the shrinking and the stretching can be maintained without loosening. Thereby a birefringent layer having a refractive index distribution satisfying nx>nz>ny can be obtained. Conditions for the heat treatment are not particularly limited and can be defined suitably according to, for example, the type of the shrinkable film. The heating temperature is, for example, in the range from 25° C. to 300° C., preferably in the range from 50° C. to 200° C., and further preferably in the range from 60° C. to 180° C. As the means for stretching the laminate, any appropriate stretching machines such as a roll stretching machine, a tenter stretching machine, a biaxial stretching machine, and the like can be used. The stretch ratio of the laminate, the shrinkage ratio of the coating film, and the thickness of the birefringent layer are as described above.

In the manner as described above, a birefringent layer having a refractive index distribution satisfying nx>nz>ny can be formed on the shrinkable film. The optical film of the present invention may be produced by a continuous production by transferring the shrinkable film or produced by a batch production. When the optical film of the present invention is produced by the batch production, the shrinkable film cut into a predetermined size is used. The birefringent layer as a laminate with the shrinkable film may be directly used for the optical film of the present invention, or the birefringent layer as a birefringent single-layer removed from the shrinkable film may be used for the optical film of the present invention. Further, the optical film of the present invention may be produced by a so-called transfer method in which the birefringent layer formed on the shrinkable film is attached on another base through a pressure sensitive adhesive agent. It is to be noted that, since the transfer is conducted after forming the birefringent layer, even when foreign matters are trapped therein at the time of transfer, productivity thereof is not decreased as in the case of a conventional method in which foreign matters are trapped at the time of attaching the resin film and the shrinkable film before forming the birefringent layer. The thickness of the optical film is preferably in the range from 10 µm to 500 µm, more preferably in the range from 20 µm to 200 µm, and further preferably in the range from 40 µm to 150 µm. In the optical film of the present invention, the front retardation of the birefringent layer is as described above.

FIG. 1 is a cross sectional view of an example of the structure of the optical film of the present invention. As shown in FIG. 1, an optical film 10 includes a shrinkable film 11 and a birefringent layer 12. The birefringent layer 12 is formed on the shrinkable film 11.

The structure of the image display of the present invention is the same as that of a conventionally known image display except that the optical film of the present invention is used. For example, in a case of LCD, the image display can be produced by suitably assembling respective components such as a liquid crystal cell, optical elements such as a polarizing plate and the like, and optionally a lightning system (backlight, etc.), and building in a drive circuit.

The image display of the present invention can be used for any appropriate applications. Examples of the application include office equipment such as a PC monitor, a notebook PC, a copy machine, and the like; portable devices such as a mobile phone, a watch, a digital camera, a personal digital assistant (PDA), a handheld game machine, and the like; home electric appliances such as a video camera, a television set, a microwave oven, and the like; display equipment such as an information monitor for stores, and the like; security equipment such as a surveillance monitor, and the like; and nursing and medical equipment such as a monitor for nursing care, a monitor for medical use, and the like; and the like.

EXAMPLES

Next, Examples of the present invention are described together with Comparative Examples. However, the present invention is not limited by the following Examples and Comparative Examples. Various properties in the respective Examples and Comparative Examples were evaluated or measured by the following methods.

<Refractive Index of Birefringent Layer>

The refractive index of a birefringent layer was measured with "KOBRA-WPR" (product name) produced by Oji Scientific Instruments, after removing the birefringent layer from a shrinkable film.

<Thickness of Birefringent Layer>

The thickness of a birefringent layer was measured with a spectrophotometer for thin film "MCPD-2000" (product name) produced by Otsuka Electronics Co., Ltd.

<Alignment Axis Accuracy of Optical Film>

The alignment axis accuracy of an optical film was measured with "KOBRA21ADH" (product name) produced by Oji Scientific Instruments, and was evaluated according to the following evaluation criteria.

Evaluation Criteria

G: the alignment axis accuracy was within the range from −1.0° to +1.0°

NG: the alignment axis accuracy was out of the range from −1.0° to +1.0°

<Appearance of Optical Film>

Figure 2:
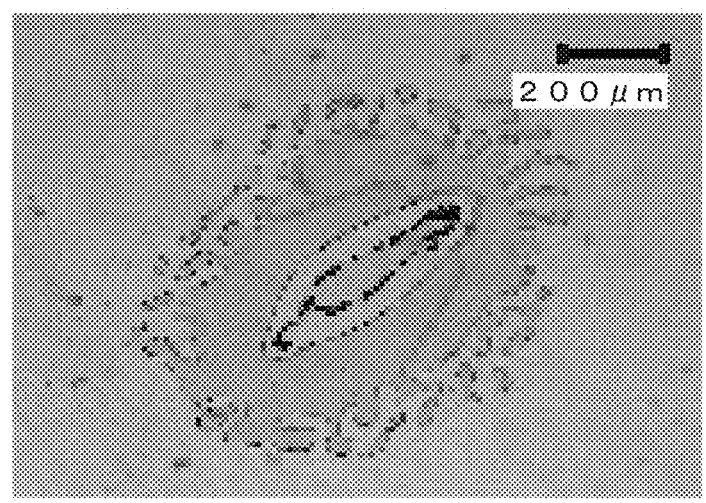
FIG. 2 is a photograph showing an optical film in which foreign matters are trapped.

The appearance of an optical film was visually evaluated. When foreign matters were clearly observed as shown in FIG. 2, it was evaluated that the appearance was not good due to foreign matters.

Evaluation Criteria

G: foreign matters trapped in the optical film were reduced, and the appearance was good NG: the appearance was not good due to foreign matters <Bright Points of Laminated Polarizing Plate>

Figure 3:
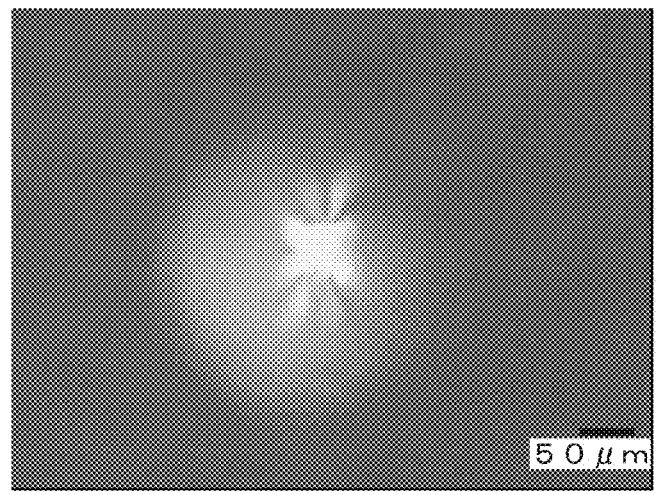
FIG. 3 is a photograph showing a laminated polarizing plate in which bright points are observed.

The appearance of bright points in a laminated polarizing plate having an optical film was evaluated. The evaluation was performed by inserting the optical film between a pair of polarizers arranged in cross-nicol and by using a differential interface microscope (Olympas Corporation). When bright points were clearly observed as shown in FIG. 3, it was evaluated that the appearance was not good due to bright points.

Evaluation Criteria

G: no bright point was observed, and the appearance was good

NG: bright points were observed, and the appearance was not good due to bright points Example 1

A material for forming a birefringent layer was prepared by dissolving a norbornene resin (10 g) to toluene (73 g). Next, a coating film was formed by directly applying the material for forming a birefringent layer on a shrinkable film (uniaxially-stretched film of an acrylic resin, 500 mm×200 mm, thickness of 93 μm) using a wire bar. Then, the coating film was dried at 110° C. for 5 minutes to produce a laminate of the shrinkable film and the coating film. Thereafter, using a batch-type simultaneous biaxial stretching machine, at 140° C., the coating film was shrunk by shrinking the laminate 0.8-fold, at the same time, the laminate was stretched 1.5-fold in a direction orthogonal to the shrinking direction of the coating film. Then, the birefringent layer was removed from the shrinkable film. The thickness of the birefringent layer was 130 μm, nx=1.521, ny=1.519, and nz=1.520. In this manner, the optical film of Example 1 was obtained.

Example 2

A material for forming a birefringent layer was prepared by dissolving a polycarbonate resin (10 g) to methylene chloride (73 g). Next, a coating film was formed by directly applying the material for forming a birefringent layer on a shrinkable film (biaxially-stretched film of PP, 500 mm×200 mm, thickness of 60 μm) using a wire bar. Then, the coating film was dried at 60° C. for 5 minutes to produce a laminate of the shrinkable film and the coating film. Thereafter, using a batch-type simultaneous biaxial stretching machine, at 150° C., the coating film was shrunk by shrinking the laminate 0.9-fold, at the same time, the laminate was stretched 1.4-fold in a direction orthogonal to the shrinking direction of the coating film. Then, the birefringent layer was removed from the shrinkable film. The thickness of the birefringent layer was 60 μm, nx=1.589, ny=1.581, and nz=1.585. In this manner, the optical film of Example 2 was obtained.

Example 3

A material for forming a birefringent layer was prepared by dissolving a cellulose acetate resin (10 g) to methylene chloride (73 g). Next, a coating film was formed by directly applying the material for forming a birefringent layer on a shrinkable film (biaxially-stretched film of PP, 500 mm×200 mm, thickness of 60 μm) using a wire bar. Then, the coating film was dried at 60° C. for 5 minutes to produce a laminate of the shrinkable film and the coating film. Thereafter, using a batch-type simultaneous biaxial stretching machine, at 120° C., the coating film was shrunk by shrinking the laminate 0.7-fold, at the same time, the laminate was stretched 2.0-fold in a direction orthogonal to the shrinking direction of the coating film. Then, the birefringent layer was removed from the shrinkable film. The thickness of the birefringent layer was 50 μm, nx=1.504, ny=1.496, and nz=1.501. In this manner, the optical film of Example 3 was obtained.

Example 4

A material for forming a birefringent layer was prepared by dissolving a polyurethane resin ("ADEKA BONTIGHTER HUX 320" (product name), produced by ADEKA CORPORATION) (10 g) to a mixed solvent of water and isopropyl alcohol (water/isopropyl alcohol=1/1) (73 g). Next, a coating film was formed by directly applying the material for forming a birefringent layer on a shrinkable film (biaxially-stretched film of PP, 500 mm×200 mm, thickness of 60 μm) using a wire bar. Then, the coating film was dried at 100° C. for 5 minutes to produce a laminate of the shrinkable film and the coating film. Thereafter, using a batch-type simultaneous biaxial stretching machine, at 120° C., the coating film was shrunk by shrinking the laminate 0.8-fold, at the same time, the laminate was stretched 1.2-fold in a direction orthogonal to the shrinking direction of the coating film. Then, the birefringent layer was removed from the shrinkable film. The thickness of the birefringent layer was 35 μm, nx=1.542, ny=1.538, and nz=1.540. In this manner, the optical film of Example 4 was obtained.

Comparative Example 1

A laminate was obtained by attaching, on the both sides of a norbornene resin film (220×120 mm, thickness of 130 μm), shrinkable films (biaxially-stretched films of PP, thickness of 60 μm) having the same size as the norbornene resin film using an acrylic pressure sensitive adhesive agent. Thereafter, using a batch-type simultaneous biaxial stretching machine, at 150° C., the norbornene resin film was shrunk by shrinking the laminate 0.8-fold, at the same time, the laminate was stretched 1.5-fold in a direction orthogonal to the shrinking direction of the norbornene resin film. Then, the birefringent layer was removed from the shrinkable film. The thickness of the birefringent layer was 131.4 μm, nx=1.521, ny=1.519, and nz=1.520.

In this manner, the optical film of Comparative Example 1 was obtained.

Comparative Example 2

A laminate was obtained by attaching, on the both sides of a polycarbonate resin film (220×120 mm, thickness of 60 μm), shrinkable films (biaxially-stretched films of PP, thickness of 60 μm) having the same size as the polycarbonate resin film using an acrylic pressure sensitive adhesive agent. Thereafter, using a batch-type simultaneous biaxial stretching machine, at 150° C., the polycarbonate resin film was shrunk by shrinking the laminate 0.9-fold, at the same time, the laminate was stretched 1.4-fold in a direction orthogonal to the shrinking direction of the polycarbonate resin film. The thickness of the birefringent layer was 60.1 μm, nx=1.589, ny=1.581, and nz=1.585. In this manner, the optical film of Comparative Example 2 was obtained.

Comparative Example 3

A laminate was obtained by attaching, on the both sides of a cellulose acetate resin film (220×120 mm, thickness of 50 μm), shrinkable films (biaxially-stretched films of PP, thickness of 60 μm) having the same size as the cellulose acetate resin film using an acrylic pressure sensitive adhesive agent. Thereafter, using a batch-type simultaneous biaxial stretching machine, at 120° C., the cellulose acetate resin film was shrunk by shrinking the laminate 0.7-fold, at the same time, the laminate was stretched 2.0-fold in a direction orthogonal to the shrinking direction of the cellulose acetate resin film. The thickness of the birefringent layer was 50 μm, nx=1.504, ny=1.496, and nz=1.501. In this manner, the optical film of Comparative Example 3 was obtained.

Comparative Example 4

A laminate was obtained by attaching, on the both sides of a polyurethane resin film (220×120 mm, thickness of 35 μm), shrinkable films (biaxially-stretched films of PP, thickness of 60 μm) having the same size as the polyurethane resin film using an acrylic pressure sensitive adhesive agent. Thereafter, using a batch-type simultaneous biaxial stretching machine, at 120° C., the polyurethane resin film was shrunk by shrinking the laminate 0.8-fold, at the same time, the laminate was stretched 1.2-fold in a direction orthogonal to the shrinking direction of the polyurethane resin film. Then, the birefringent layer was removed from the shrinkable film. The thickness of the birefringent layer was 35 μm, nx=1.542, ny=1.538, and nz=1.540. In this manner, the optical film of Comparative Example 4 was obtained.

Properties of respective optical films of Examples and Comparative Examples were measured or evaluated. The results are summarized in the following Tables 1 and 2.

polarizing plate to an image display, an image display having no display defect can be provided.

Industrial Applicability

According to the method for producing an optical film of the present invention, an optical film including a birefringent layer having a refractive index distribution satisfying nx>nz>ny that can be produced by a small number of steps and contains less foreign matter trapped therein can be produced. Therefore, the optical film of the present invention can be used suitably for, for example, image displays such as LCD and the like. The application thereof is not particularly limited and can be applied to a wide range of fields.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

TABLE 1

|  | Shrinkable film | Birefringent layer forming material | Forming method | Stretch ratio | Shrinkage ratio |
| --- | --- | --- | --- | --- | --- |
| Ex. 1 | Uniaxially-stretched acrylic resin | Norbornene resin | Application | 1.5 | 0.8 |
| Ex. 2 | Biaxially-stretched PP | Polycarbonate resin | Application | 1.4 | 0.9 |
| Ex. 3 | Biaxially-stretched PP | Cellulose acetate resin | Application | 2.0 | 0.7 |
| Ex. 4 | Biaxially-stretched PP | Polyurethane resin | Application | 1.2 | 0.8 |
| Comp. Ex. 1 | Biaxially-stretched PP | Norbornene resin | Attachment | 1.5 | 0.8 |
| Comp. Ex. 2 | Biaxially-stretched PP | Polycarbonate resin | Attachment | 1.4 | 0.9 |
| Comp. Ex. 3 | Biaxially-stretched PP | Cellulose acetate resin | Attachment | 2.0 | 0.7 |
| Comp. Ex. 4 | Biaxially-stretched PP | Polyurethane resin | Attachment | 1.2 | 0.8 |

TABLE 2

|  | nx | ny | nz | Front retardation (nm) | Thickness (μm) | Axis accuracy | Appearance | Bright Points |
| --- | --- | --- | --- | --- | --- | --- | --- | --- |
| Ex. 1 | 1.521 | 1.519 | 1.520 | 260 | 130 | G | G | G |
| Ex. 2 | 1.589 | 1.581 | 1.585 | 480 | 60 | G | G | G |
| Ex. 3 | 1.504 | 1.496 | 1.501 | 400 | 50.0 | G | G | G |
| Ex. 4 | 1.542 | 1.538 | 1.540 | 140 | 35 | G | G | G |
| Comp. Ex. 1 | 1.521 | 1.519 | 1.520 | 262.8 | 131.4 | NG | NG | NG |
| Comp. Ex. 2 | 1.589 | 1.581 | 1.585 | 480.8 | 60.1 | NG | NG | NG |
| Comp. Ex. 3 | 1.504 | 1.496 | 1.501 | 400 | 50.0 | NG | NG | NG |
| Comp. Ex. 4 | 1.542 | 1.538 | 1.540 | 140 | 35 | NG | NG | NG |

As summarized in the tables 1 and 2, the optical films of Examples showed favorable results in the alignment axis accuracy, the appearance, and the bright points. In contrast, the optical films of Comparative Examples showed inferior results in the alignment axis accuracy, the appearance, and the bright points.

As described above, when laminated polarizing plates were produced by laminating polarizing plates with the optical films obtained in Examples, bright spots caused by foreign materials were not observed and light leak due to alignment defects was not observed. Further, by mounting the laminated

What is claimed is:

1. A method for producing an optical film comprising a birefringent layer, comprising the steps of:

forming a coating film by directly applying a material for forming a birefringent layer on a shrinkable film;

shrinking the coating film in a first direction by shrinking the shrinkable film; and stretching a laminate of the shrinkable film and the coating film in a second direction orthogonal to the first direction, wherein the material for forming a birefringent layer contains at least one resin selected from the group consisting of norbornene resins, polycarbonate resins, cellulose resins, polyamides, and polyurethanes, wherein the birefringent layer has a refractive index distribution satisfying nx>nz>ny, where nx is a refractive index in a direction which is a slow axis direction in which an in-plane refractive index of the birefringent layer reaches its maximum, ny is a refractive index in a direction which is a fast axis direction that is orthogonal to the nx direction within a plane of the birefringent layer, and nz is a refractive index in a thickness direction of the birefringent layer that is orthogonal to each of the nx and ny directions, and wherein the birefringent layer has a front retardation in a range from 130 to 500 nm; and wherein the birefringent layer has an alignment axis accuracy within the range from −1.0° to +1.0°.

2. The method for producing an optical film according to claim 1, wherein a stretch ratio of the laminate in the stretching is in a range from 1.01-fold to 3.00-fold.

3. The method for producing an optical film according to claim 1, wherein a shrinkage ratio of the coating film in the shrinking is in a range from 0.50-fold to 0.99-fold.

4. The method for producing an optical film according to claim 1, wherein the shrinkable film is a stretched film formed from at least one material selected from the group consisting of acrylic resins, polyolefins, polyesters, polyamides, polycarbonate resins, norbornene resins, polystyrenes, polyvinyl chlorides, polyvinylidene chlorides, cellulose resins, polyether sulfones, polysulfones, polyimides, polyacrylics, acetate resins, polyarylates, polyvinyl alcohols, and liquid crystal polymers.

5. The method for producing an optical film according to claim 1, wherein in the shrinking, the shrinkable film is shrunk by heating.

* * * * *